United States Patent [19]

Pippert

[11] Patent Number: 4,839,983

[45] Date of Patent: Jun. 20, 1989

[54] FISHING LURE APPARATUS WITH FISH ATTRACTANT

[75] Inventor: Aaron J. Pippert, Houston, Tex.

[73] Assignee: Utex Industries, Inc., Houston, Tex.

[21] Appl. No.: 101,600

[22] Filed: Sep. 28, 1987

[51] Int. Cl.⁴ .............................................. A01K 85/01
[52] U.S. Cl. .................................... 43/42.06; 43/17.6; 43/42.5
[58] Field of Search .................. 43/17.6, 42.06, 42.09, 43/42.11, 42.15, 42.18, 42.28, 42.37, 42.38, 42.5

[56]  References Cited

U.S. PATENT DOCUMENTS

| | | | |
|---|---|---|---|
| 744,942 | 11/1903 | Stewart | 43/42.15 |
| 1,903,256 | 3/1933 | Catarau | 43/42.5 |
| 2,632,276 | 3/1953 | Hale | 43/42.06 |
| 3,236,000 | 2/1966 | Pippert | 43/42.18 |
| 3,539,794 | 11/1970 | McKay et al. | |
| 3,576,987 | 5/1971 | Voight | |
| 3,597,362 | 8/1971 | Bollyky et al. | |
| 3,722,128 | 3/1973 | Tremblay | 43/42.06 |
| 3,861,072 | 1/1975 | Holcombe | |
| 3,895,455 | 7/1975 | Johnston | |
| 3,921,328 | 11/1975 | Holcombe | |
| 3,964,202 | 6/1976 | Ruppa | 43/42.38 |
| 3,971,152 | 7/1976 | Husson, Jr. | |
| 4,267,658 | 5/1981 | Brown | 43/42.06 |
| 4,581,839 | 4/1986 | Mattison | |
| 4,589,221 | 5/1986 | Mattison | |
| 4,610,103 | 9/1986 | Steinman | 43/17.6 |
| 4,638,584 | 1/1987 | Lindsay | |
| 4,709,499 | 12/1987 | Ottaviano | 43/17.6 |

OTHER PUBLICATIONS

Lunker Lights advertising brochure, 1986 American Cyanamid, 8/86.
LumaLure advertising catalog, 12 pages, LumaLure Mfg., Inc. 1986.
LumaLure ad in *Fishing Tackle Retailer Magazine*, Sep. 1986, p. 36.
BriteWater Brand Luminous Lures advertising brochure, undated.
Vortex Lures Catalog 1987.

Primary Examiner—Kurt Rowan
Attorney, Agent, or Firm—Browning, Bushman, Zamecki & Anderson

[57]  ABSTRACT

A fishing lure member has an internal cavity having an opening through at least one external surface thereof. A fish attractant is disposed at least partially within the cavity. The attractant may be removably retained in the cavity by cooperation of the body member and an insert having at least a portion disposed within the cavity. Alternatively, the matter may be a web-like member having opposite broad surfaces bounded by relatively thin peripheral edges; the attractant can be disposed in a pocket extending along at least one of these broad surfaces.

25 Claims, 3 Drawing Sheets

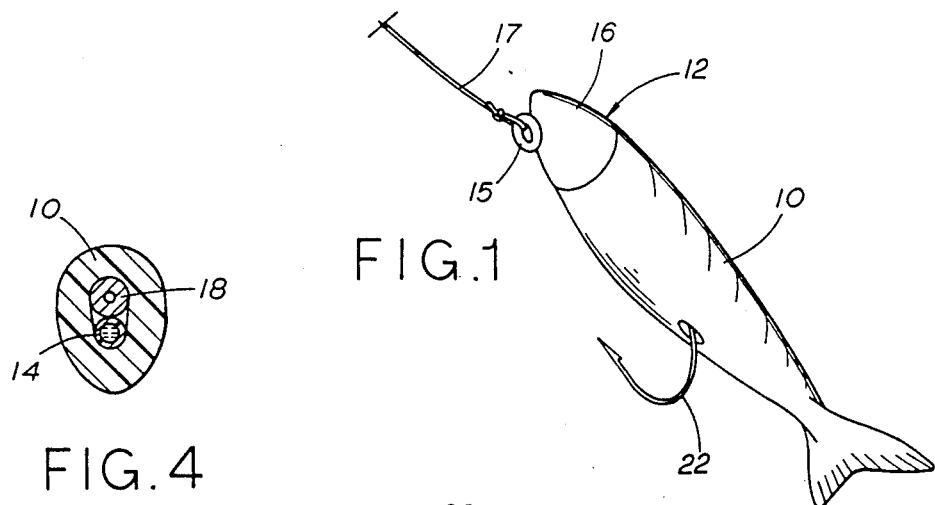
FIG. 1
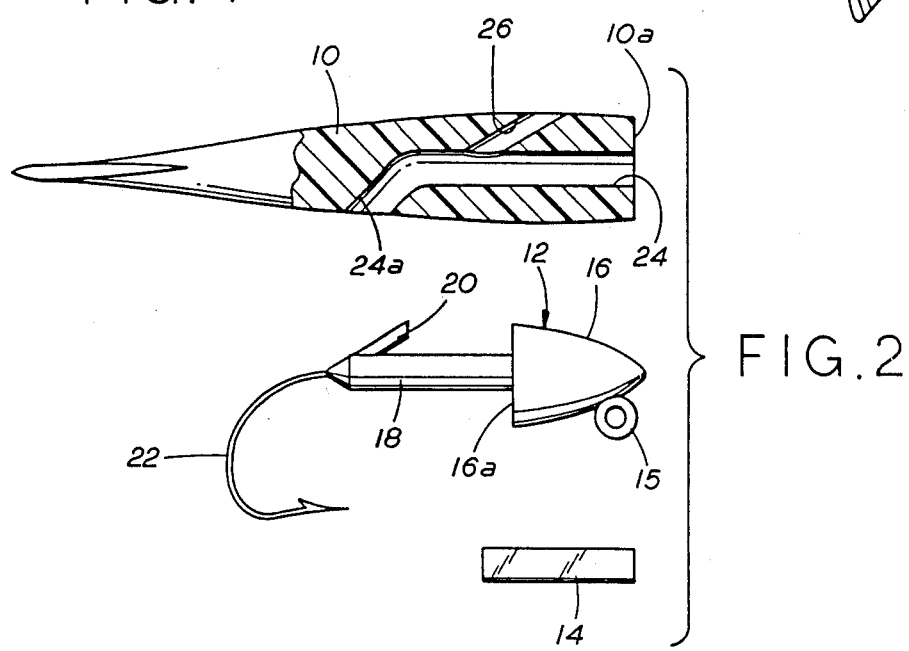
FIG. 4
FIG. 2
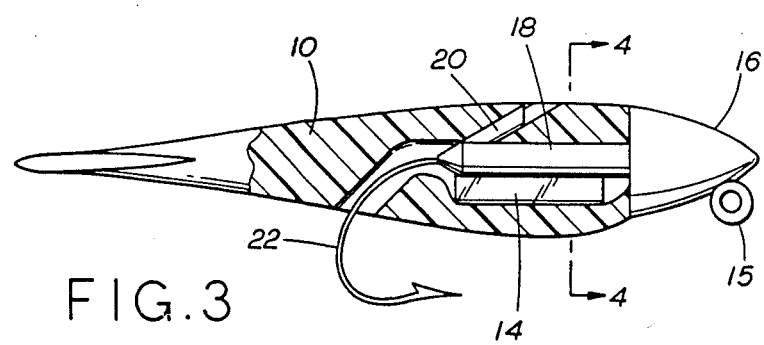
FIG. 3

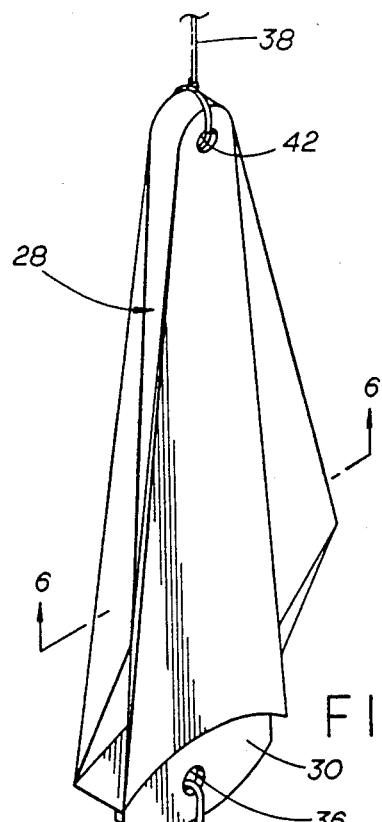
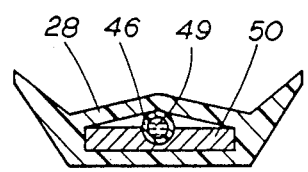
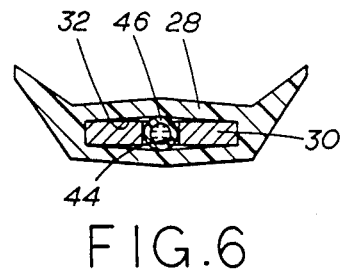
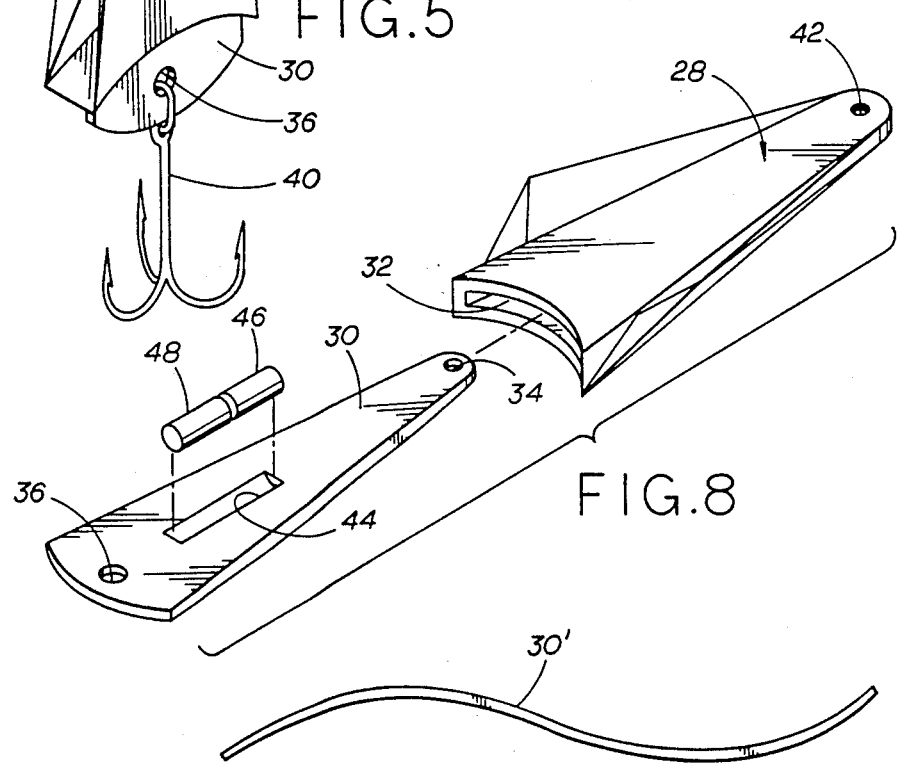

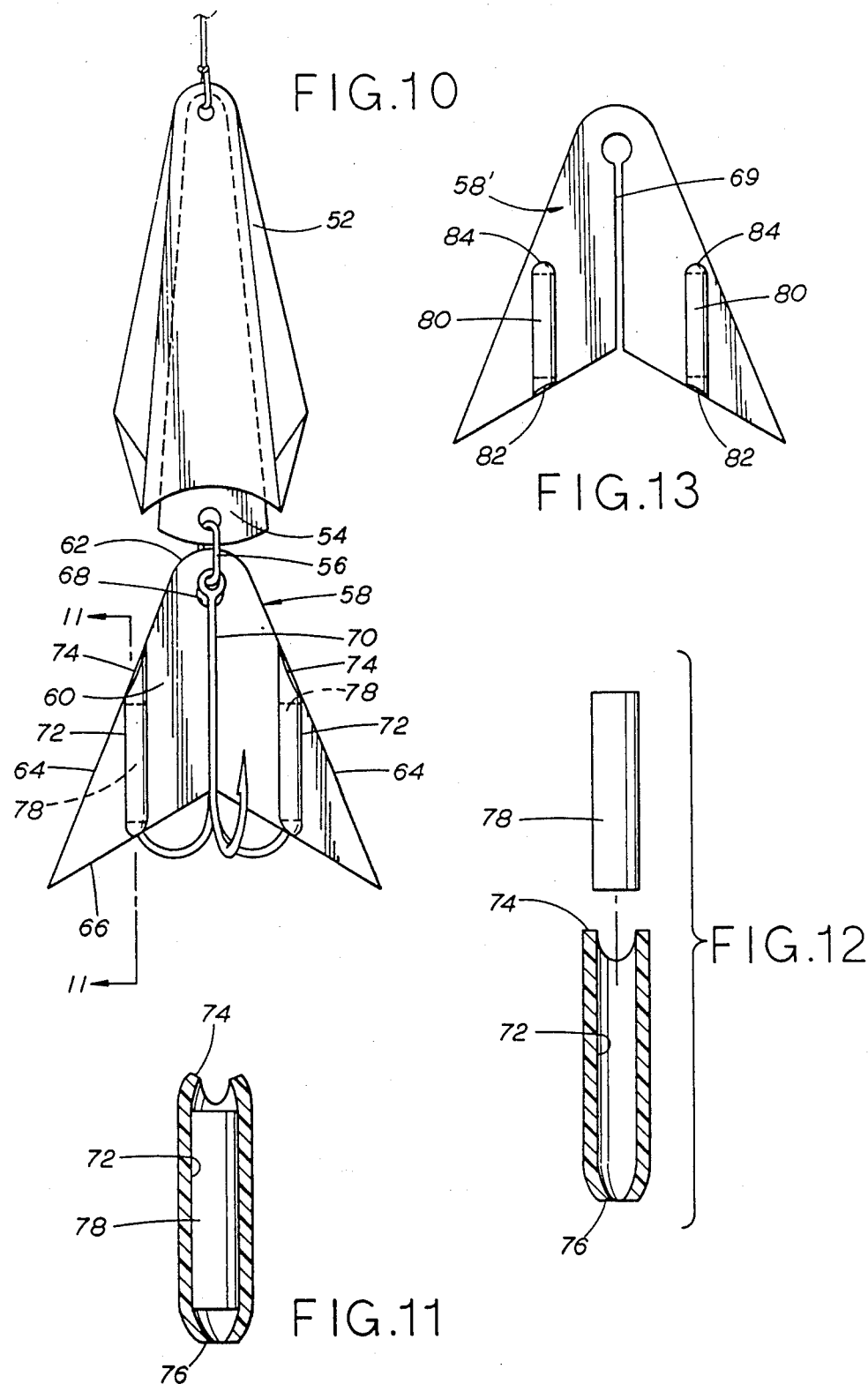

FISHING LURE APPARATUS WITH FISH ATTRACTANT

BACKGROUND OF THE INVENTION

1. Field of the Invention

The present invention pertains to fishing lure apparatus, and in particular, to such apparatus containing or capable of containing a removable fish attractant, such as a light source or an olfactory attractant.

2. Description of the Prior Art

Self-contained chemiluminescent light sources are well known. General descriptions of such light sources may be found in U.S. Pat. Nos. 3,597,362, 3,576,987, and 3,539,794. At least some such light sources comprise a cartridge within which there are two chambers separated by a frangible interior wall. The two chambers contain two different chemicals. The outer wall of the cartridge as a whole is flexible, whereby it can be squeezed, bent or twisted to break the frangible interior wall. This allows mixture of the two chemicals previously separated by the frangible wall; the chemicals react to produce light for a certain period of time.

It has also been known to place such sources on or in fishing lures. However, in genera,, where the devices have been carried largely externally of the lures, they have protruded therefrom, sometimes forming relatively sharp angles and the like, and this has, for example, caused problems by interfering with proper action of the lure in the water.

Also, whether the chemiluminescent cartridge was carried externally or internally of the lure body, it has in general been the practice to provide special cavities or the like for receipt of the chemiluminescent cartridges. In some instances, it has been suggested that the user of the lure could simply make a hole in an existing lure body and place a chemiluminescent cartridge therein. This is clearly troublesome, and difficult for the user, and would probably not result in adequate means for retaining the cartridge in the lure.

Examples of the use of chemiluminescent sources in fishing lures are given in U.S. Pat. Nos. 4,581,839, 4,589,221, 3,921,328, 3,861,027, 3,895,455, 4,610,103, 4,638,584, and in the various commercial publications disclosed in the Prior Art Statement submitted herewith.

Olfactory fish attractants have also been known. They may be applied to the exterior of a lure body, in the form of a liquid or a more viscous flowable or formable substance, but it is believed that their effect when thus applied is quickly dissipated and/or diluted as the lure is used in the water. In some instances, see e.g. U.S. Pat. No. 3,971,152, it has been suggested to use fish attractants in solid form in a cavity in a lure body. However, the special formations required in the lure were fully as complicated and troublesome as those for chemiluminescent attractants.

SUMMARY OF THE INVENTION

In one aspect, the present invention takes advantage of fishing lure assemblies in which the primary lure body member is already provided with a cavity for at least partial receipt of an insert, the insert forming part of the composite lure assembly. A fish attractant element is disposed at least partially within the cavity, along with the insert, and the insert is cooperative with the primary lure body member to releasably retain the fish attractant element within the cavity.

This allows these prior lure assemblies, with all of their own respective advantages, to be used with fish attractants, with little or no modification, but nevertheless, with significant advantages over the prior art attractant lures. This eliminates the need for any substantial increase in manufacturing costs, while also eliminating trouble for the user, and providing an improved way of releasably retaining the fish attractant element in the lure assembly.

In one embodiment, the primary lure body member is a relatively soft highly flexible member, typically defining the central and tail portion of the lure, and which is resiliently deformable. The insert includes a weighted head, which is disposed adjacent and outside the primary lure body member in use, completing its external configuration, and having a shank which extends through the cavity in the lure body member, the fish hook being attached to the far end of the shank from the weighted head and protruding through a hole in the primary lure body member.

In this embodiment, the chemiluminescent or other fish attractant element can be placed in the same cavity designed to receive the insert shank, the primary lure body member simply deforming outwardly to receive the adjacent portions of the insert and the fish attractant element. The nature of the soft deformable lure body member allows this expansion to occur without forming any sharp external angles or the like, and in any event, the weighted head/soft body type lure is not the type in which the slight bulge caused by the fish attractant element would significantly adversely affect the desired action of the lure in the water.

In another embodiment, the primary lure body is of the spoon type, and the insert is a plate-like, rigid member which extends through the spoon body to provide support and/or to "fine tune" the configuration of the spoon and its action in the water. In order to prevent the fish attractant element from adversely affecting such action, the insert may be provided with a recess, such as a slot, in which the fish attractant element may be received. It can be appreciated that this is a relatively easy and inexpensive modification, and one which will in no way interfere with the possibility of using the lure assembly without the fish attractant element, if desired.

In another aspect, the present invention encompasses a fishing lure member which may be used as a lure alone, but is more preferably attached to another lure as a fish attractant in and of itself. Such a member has a web-like body, preferably caudal shaped. It may be attached to the trailing end of the other lure, as by a ring link, so that it can move about in the water relative to the lure and thus simulate the action of the tail of a real fish. A pocket is provided along at least one of the broad surfaces of this web-like member for receipt of the fish attractant.

The web-like body may be a very inexpensive item, which can practically be thrown away and replaced after relatively few uses, which ameliorates the need to provide a separate pocket. Furthermore, it is believed that the combined fish attractant effect of the articulated caudal-shaped member, when combined with another fish attractant, may be particularly effective in achieving the purpose of the lure member, i.e. to attract fish.

Accordingly, it is a principal object of the present invention to provide fishing lure apparatus with improved fish attractant capabilities.

Another object of the present invention is to provide a fishing lure assembly in which a primary lure body, and an insert disposed at least partially in a cavity in the primary lure body for a first purpose further interact to retain a fish attractant element within that cavity.

Another object of the present invention is to provide a fishing lure assembly in which an insert, adapted to be disposed in a cavity in a primary lure body, includes a recess sized and configured to receive a fish attractant.

Still another object of the present invention is to provide a web-like lure body member having a pocket for receipt of a fish attractant.

Still other objects, features and advantages of the present invention will be made apparent by the following detailed description, the drawings and the claims.

BRIEF DESCRIPTION OF THE DRAWINGS

FIG. 1 is a perspective view of a first fishing lure assembly according to the present invention.

FIG. 2 is an exploded view of the assembly of FIG. 1.

FIG. 3 is a longitudinal cross-sectional view of the assembly of FIG. 1.

FIG. 4 is a transverse cross-sectional view taken on the line 4—4 of FIG. 3.

FIG. 5 is a perspective view of a second embodiment of lure assembly according to the present invention.

FIG. 6 is a transverse cross-sectional view taken on the line 6—6 of FIG. 5.

FIG. 7 is a view similar to that of FIG. 6 showing another embodiment.

FIG. 8 is an exploded view of the assembly of FIG. 5.

FIG. 9 is a side elevational view of an alternative insert for use in the assembly of FIGS. 5 and 8.

FIG. 10 is a plan view of a third embodiment of fishing lure assembly according to the present invention, including a fish attractor member.

FIG. 11 is a detailed cross-sectional view taken on the line 11—11 of FIG. 10.

FIG. 12 is a view similar to that of FIG. 11 showing the attractant element removed from the pocket.

FIG. 13 is a plan view of another embodiment of fish attractor member.

DETAILED DESCRIPTION p Referring to FIGS. 1-4, there is shown a first embodiment of the present invention. In particular, this embodiment shows how a fish attractant element can be incorporated in a fishing lure assembly generally of the type disclosed in my prior U.S. Pat. No. 4,672,768. To the extent that said prior patent is helpful to an understanding of the present invention, it is expressly incorporated herein by reference.

Referring more specifically to the drawings, the assembly of FIGS. 1-4 includes three main parts, a primary lure body member 10, an insert member 12, and a fish attractant element 14, in the form of a chemiluminscent cartridge.

The primary lure body member 10 is of a familiar type, which is relatively soft and highly flexible, and is also resiliently deformable, as by stretching. It can, for example, be molded of such materials as polyvinyl chloride or vinyl plastisols. The precise configuration illustrated is somewhat arbitrary, and it will be appreciated that bodies of this type are commonly formed to simulate shrimp, worms, small fish, or the like, as desired.

The primary lure body member 10 defines the central and tail portions of the lure body.

The head of the lure body is formed by the leading weighted head portion 16 of insert member 12. At the trailing end of weighted head 16, there is a shoulder 16a sized to abut and match the leading face of 10a of primary lure body member 10. Extending rearwardly from shoulder 16a is a shank 18 of smaller diameter. A retaining lug 20 extends angularly forward and radially outwardly from the shank 18 near its trailing end. Fixed to and extending rearwardly and outwardly from the extreme trailing end of shank 18 is the fish hook 22.

Primary lure body member 10 has a primary cavity 24 opening through leading face 10a and extending generally longitudinally rearwardly therefrom through body 10. Toward its trailing end, cavity 24 is angled radially outwardly as shown at 24a. A retaining channel 26 extends forwardly and radially outwardly from cavity 24 in branch-like fashion. Channel 26 is positioned and configured to receive lug 20.

As explained more fully in the aforementioned prior patent, the insert member 12 can be assembled with the primary lure body member 10 by gently squeezing and curving the member 10 with the fingers, inserting the end of hook 22 into the end of cavity 24 opening through face 10a and guiding the hook 22 by pressing it unbarbed or convex side against the upper side of cavity 24, until the end of the hook is brought out through the opening of the trailing portion 24a of cavity 24, as shown in FIGS. 1 and 3. Lug 20 will have been brought into channel 26, to help retain the two parts in proper relationship with shoulder 16a adjacent face 10a. The two parts can be disassembled by a generally reverse action.

Body member 10 is translucent. When it is desired to use the fish attractant element 14 in the assembly, element 14 is first inserted into the forward portion of cavity 24. Thereafter, due to the resilient deformability of body member 10, the insert member 12 can be assembled into the body member 10 in the usual manner, and body member 10 will simply stretch or deform outwardly, as shown in FIGS. 3 and 4, to accommodate the element 14. In some instances, it might also be possible to hold the element 14 adjacent the shank 18 of the insert, and assemble the two jointly into the body member 10. In any event, prior to, during or after assembly, the element 14 can be squeezed or bent to break the frangible wall therein and allow the two chemicals to mix, producing light. It can also be appreciated that, when the light source is depleted, the assembly can be disassembled and the element 14 replaced.

The weighted head-type assembly of FIGS. 1-4 is, unlike a spoon-type lure, designed to flex and wiggle as it is played in the water. Small changes in the external configuration, such as the slight bulge caused by the inclusion of element 14, will not significantly impact its effectiveness. Furthermore, the soft nature of the body 10 will accommodate the element 14 without any objectionable sharp angles or the like in the overall external shape, as shown in FIG. 4.

It can be seen that insert member 12 and body 10 co-act to removably retain element 14 in cavity 24. Since cavity 24 is normally sized to receive shank 18 fairly precisely, when the element 14 is emplaced in the cavity along with the shank, the body 10 is stretched, as described hereinabove, and its resilience holds the element 14 tight. Furthermore, shoulder 16a covers the face 10a through which the cavity 24 opens, and the positioning of lug 20 in channel 26 and hook 22 in the cavity end 24a help to retain these two surfaces in close proximity, also serving to retain element 14.

Weighted head portion 16 is also provided with a ring 15 for the fishing line 17, so that the pull, in use, is borne by the insert member 12, rather than by the relatively soft body member 10, which could otherwise be more easily torn.

Turning next to FIGS. 5, 6 and 8, there is shown a second embodiment of the present invention. In this case, the fishing lure assembly is of the spoon-type. In particular, the assembly is of the type disclosed in my prior U.S. Pat. No. 4,573,283 and in my U.S. application Ser. No. 801,551, now U.S. Pat. No. 4,700,503, both of which are hereby expressly incorporated by reference. The assembly includes a molded, synthetic primary lure body member 28 which defines the general spoon-type configuration of the lure.

The assembly further includes a rigid, plate-like metal insert 30 which is removably disposed in a longitudinal cavity 32 in body member 28. As mentioned, body member 28 is preferably sufficiently flexible so that its configuration, and thus its action in the water, can be "fine tuned," by the use of different inserts. For example, the insert 30 is straight and flat, while the insert 30' of FIG. 9, which can be substituted for insert 30, is of sigmoid configuration. However, body member 28 is not of the extremely soft and flexible variety of the preceding embodiment, i.e. it does not flop or wiggle.

The insert 30 is preferably formed of metal, and serves to strengthen and complete the lure body assembly. It provides attachment points 34 and 36 for the line 38 and hook 40. Access to opening 34 of the insert 30 is through a line opening 42 in body member 28, while access to opening 36 is by virtue of the fact that the trailing end of the insert protrudes slightly through the rear opening of cavity 32. Thus, the pull which occurs when a fish is being played is taken by the metal insert, rather than by the body member 28.

With spoon-type lures, small variations in the external configuration can significantly affect the action of the lure in the water. Indeed, it is for this purpose that 15 substitute inserts, such as insert 30' of FIG. 9, are provided. Accordingly, it is desirable to eliminate large bulges, sharp angles, etc.

Insert 30 is provided with a straight-sided longitudinal slot 44 which defines a recess for receipt of one or more fish attractants. In the embodiment shown, a cylindrical chemiluminescent element 46 and an olfactory fish attractant element, diagrammatically indicated at 48, are disposed end-to-end in slot 44. Element 46 is first squeezed or bent to activate it. After placing elements 46 and 48 in slot 44, insert 30 can be inserted in cavity 32 through its rear opening. The body member 28 and insert 30 coast to retain the elements 46 and 48 in cavity 32. The insert 30 can likewise be removed when it is desired to replace the attractant elements and/or the insert itself.

The scent from the olfactory element 48 can disseminate outwardly through the cavity 32, but is somewhat contained, so that it is less likely to become quickly dissipated or diluted to the point of ineffectiveness.

Slot 44 in no way interferes with the use of insert 30 and body member 28 without fish attractant elements. Also, it represents a very simple and inexpensive modification of the basic insert 30. Nevertheless, it accommodates fish attractant elements, as desired, without significant change in the overall external configuration, as best seen with reference to FIG. 6.

It will be appreciated that, because chemiluminescent and olfactory fish attractant elements are generally flexible, they could likewise be used with a curved insert, such as 30' of FIG. 9.

FIG. 7 shows an alternate embodiment in which the recess 49 in the insert 50 is a groove, rather than a slot extending all the way through the insert. When this insert 50 is used with the element 46 and body 28, the element 46 protrudes somewhat more from the upper side of insert 50, and thus causes a slight bulge on the upper side of body 28. However, this relatively small bulge, with its very gradually sloping sides, does not seriously change the action of the lure in the water. It is preferable that the depth of the recess be greater than half the diameter or thickness of the attractant element, while the length and width of the recess are at least as great as those of the attractant element, so that the recess accommodates a major portion of the element.

As in the preceding embodiment, the body member 28 is translucent, at least in one or more areas adjacent the portion of cavity 32 receiving element 46, so that the light emitted thereby will be visible through the lure body member 28.

In other modifications, inserts could be provided with multiple recesses for respective attractants.

Referring next to FIGS. 10-12, there is shown still another embodiment of the present invention. FIG. 10 illustrates an assembly including a spoon-type lure body member 52 with an insert 54, the two being more or less similar to members 28 and 30 of the preceding embodiment. A fish attractant member 58 is attached by a ring 56 to the trailing end of insert 54.

The attractor member 58 is generally of the form disclosed in my prior U.S. Pat. No. 3,236,000, hereby incorporated by reference. Briefly, it comprises a thin web-like member having a pair of opposite broad surfaces, one of which is shown at 60, bounded by relatively thin peripheral edges. The peripheral edges define a generally caudal shape, i.e. a shape resembling the tail fin of a fish or the like. The leading end 62 is relatively narrow and rounded, with the side edges 64 diverging rearwardly. The trailing edge 66 defines a wide inverted V-type configuration.

There is a hole 68 through the member 58 near its leading end 62, whereby it can be attached to the ring 56. A slit, similar to the slit 69 of the alternate embodiment of FIG. 13, communicates with hole 68 and extends rearwardly, opening through trailing edge 66. This slit facilitates emplacement of the member 58 on ring 56. More specifically, the relatively thin, flexible web can be bent or curled so that one side can be passed through the ring 56. However, it is also possible to form the member without a slit, in which case a split ring would be used for attachment. The slit also accommodates the shaft 70 of the fish hook which is attached to the main lure assembly by the same ring 56 as the member 58.

Two pockets 72 are integrally molded into member 58. Each pocket is generally straight-sided and extends generally longitudinally along a respective side of member 58. As best seen in FIG. 11, each pocket has a leading opening 74 opening through the respective side edge 64, and a vent hole 76 opening through the trailing edge 66. A fish attractant 78 can be emplaced in the pocket 72 through the leading opening 74. The fish attractant element can be a chemiluminescent cartridge, an olfactory attractant, or a combination of the two; or a chemiluminescent element can be emplaced in one of the pockets 72, while an olfactory element might be placed in the other pocket.

As best seen by comparing FIGS. 11 and 12, the pocket 72, in a relaxed condition, is longer but narrower than the attractant element 78 (this is shown exaggerated in FIG. 12 for clarity). Due to the flexible nature of the member 58, the pocket can deform to accommodate the fish attractant element, and the mouth of the opening 74 will tend to close in slightly over the adjacent end of the element 78 as shown in FIG. 11 to hold the element in place. When it is desired to remove the element, the user can squeeze the trailing end of the pocket, e.g. between the fingernails of the thumb and forefinger, and slide the fingers forward to force the element out of the pocket.

Because the member 58 is attached to the main lure assembly 52, 54 by ring 56, it is articulated and can simulate the movements of a fish tail in use. Thus, it is itself a fish attractor, but also incorporates further fish attractant elements 78. It is also possible, if desired, to use the member 58 as a lure in and of itself.

FIG. 13 shows an alternate embodiment in which the member 58' is of the same form as the member 58 except for the pockets 82. These pockets have mouths 82 opening through the trailing edge of the member 58, and rather than passing along the full length of member 58, terminate in blind leading ends 84. Otherwise, the member 58' in its use is virtually identical to that of the member 58.

The members 58 and 58' can be formed of any suitable material, preferably flexible, and preferably also translucent, at least in the vicinity of the pockets. Various synthetic materials are suitable. In the embodiments shown, the members are integrally molded, although they could be formed as laminated structures.

Numerous modifications in the preferred embodiments described above can be made within the spirit of the invention. By way of example only, while the primary lure body members 10 and 28 have been described as translucent throughout, they could be opaque in part, or partially painted with opaque paints, although if chemiluminescent attractant elements are used therewith, they are preferably at least partially translucent in an area adjacent the cavity which receives such element. While solid fish attractant elements have been illustrated, flowable or putty-like formable fish attractants could be used in at least some instances. Numerous other modifications will suggest themselves to those of skill in the art. Accordingly, it is intended that the scope of the invention be limited only by the claims which follow.

What is claimed is:
1. A fishing lure member comprising:
a web-like body member having a pair of opposite broad surfaces bounded by relatively thin peripheral edges, a leading end adapted for attachment to a linking ring or the like, and a trailing end distal the leading end;
means on said body member defining two pockets extending along at least one of said broad surfaces and each having an opening;
said pockets are elongated in the leading-trailing direction, each of said openings being disposed at one end of the respective pocket;
respective fish attractants removably disposed in said pockets;
said lure member is at least partially translucent in an area adjacent one of said pockets;
one of said fish attractants comprising a self-contained chemiluminescent cartridge light source disposed adjacent said translucent area;
said chemiluminescent cartridge light source is flexible and defines two inner chambers, separated by wall means frangible upon flexure of said light source, each of said chambers containing a respective substance, said two substances being capable of producing light when brought into contact with each other; and
an olfactory fish attractant removably disposed in the other of said pockets.

2. The lure member of claim 1 wherein said other of said pockets further has a vent hole at the other end.

3. The lure member of claim 1 being comprised of deformable material.

4. The lure member of claim 3 wherein at least one of said fish attractants comprises a solid element, and the respective pocket, in a relaxed state with said fish attractor element removed, is slightly larger and narrower than said fish attractor element.

5. The lure member of claim 1 wherein said two pockets are disposed one on each side of said body member approximately equidistant from a centerline extending from said leading end to said trailing end.

6. The lure member of claim 5 wherein said lure body member, including said broad surfaces, has a generally caudal shape defined by two of said peripheral edges, being side edges, flaring outwardly from the leading end of said body member to the trailing end of said body member.

7. The lure member of claim 6 wherein said lure body member has an attachment hole through the leading end thereof so adapting it for attachment to such linking ring or the like.

8. The lure member of claim 7 wherein said lure body member is comprised of a flexible material.

9. The lure member of claim 8 wherein said lure body member has a slit extending from the trailing end thereof to said attachment hole.

10. The lure member of claim 6 being attached to the trailing end of a primary lure body for articulation with respect to said primary lure body.

11. The lure member of claim 1 wherein said pockets have substantially straight sides.

12. A fishing lure member comprising:
a web-like body member having a pair of opposite broad surfaces bounded by relatively thin peripheral edges, a leading end adapted for attachment to a linking ring or the like, and a trailing end distal the leading end;
means on said body member defining two pockets extending along at least one of said broad surfaces and each having an opening;
said pockets are elongated in the leading-trailing direction
each of said openings being disposed at one end of the respective pocket;
said two pockets are disposed one on each side of said body member approximately equidistant from a centerline extending from said leading end to said trailing end; and
said lure body member, including said broad surfaces, generally caudal shape defined by two of said peripheral edges, being side edges, flaring outwardly from the leading end of said body member to the trailing end of said body member.

13. The lure member of claim 1 wherein each of said pockets further has a vent hole at the other end.

14. The lure member of claim 12 further comprising respective fish attractants removably disposed in said pockets.

15. The lure member of claim 12 wherein said body member is comprised of deformable material.

16. The lure member of claim 14 wherein at least one of said fish attractants comprises a solid element, and the respective pocket, in a relaxed state with said fish attractant element removed, is slightly longer and narrower than said fish attractant element.

17. The lure member of claim 16, wherein said lure member is at least partially translucent in an area adjacent one of said pockets, and fish attractant in said pocket adjacent said translucent area comprises a light source.

18. The lure member of claim 17 wherein the fish attractant in the other of said pockets is an olfactory fish attractant removably disposed in said other pocket.

19. The lure member of claim 14 wherein said fish attractant in at least one of said pockets is an olfactory fish attractant.

20. The lure member of claim 12 wherein said body member has a attachment hole through the leading end thereof so adapting it for attachment to a linking ring or the like.

21. The lure member of claim 20 wherein said lure body member is comprised of a flexible material.

22. The lure member of claim 21 wherein said lure body member has a slit extending from the trailing end thereof to said attachment hole.

23. The lure member of claim 12 wherein said body member defines two such pockets, one on each side of said body member, running generally parallel to a line extending from said narrow end to said wide end.

24. The lure member of claim 12 being attached to the trailing end of a primary lure body for articulation with respect to the primary lure body.

25. The lure member of claim 12, wherein each of said pockets has substantially straight sides.

* * * * *

UNITED STATES PATENT AND TRADEMARK OFFICE
CERTIFICATE OF CORRECTION

PATENT NO. : 4,839,983

DATED : June 20, 1989

INVENTOR(S) : Aaron J. Pippert

It is certified that error appears in the above-identified patent and that said Letters Patent is hereby corrected as shown below:

In Column 8, line 17, delete "being" and insert therefor --wherein said body member is--.

In Column 8, bridging lines 21 and 22, delete "attractor" and insert therefor --attractant--.

In Column 8, line 22, delete "larger" and insert therefor --longer--.

Signed and Sealed this

Fifth Day of June, 1990

Attest:

HARRY F. MANBECK, JR.

*Attesting Officer*     *Commissioner of Patents and Trademarks*